(12) United States Patent
Kruse

(10) Patent No.: US 10,333,918 B2
(45) Date of Patent: Jun. 25, 2019

(54) AUTOMATED SYSTEM IDENTIFICATION, AUTHENTICATION, AND PROVISIONING

(71) Applicant: Accenture Global Solutions Limited, Dublin (IE)

(72) Inventor: Vincent Kruse, Bicester (GB)

(73) Assignee: Accenture Global Solutions Limited, Dublin (IE)

( * ) Notice: Subject to any disclaimer, the term of this patent is extended or adjusted under 35 U.S.C. 154(b) by 207 days.

(21) Appl. No.: 15/439,344

(22) Filed: Feb. 22, 2017

(65) Prior Publication Data

US 2018/0241751 A1 Aug. 23, 2018

(51) Int. Cl.
*H04L 29/06* (2006.01)

(52) U.S. Cl.
CPC ............ *H04L 63/08* (2013.01); *H04L 63/102* (2013.01)

(58) Field of Classification Search
CPC ................................ H04L 63/08; H04L 63/10
See application file for complete search history.

(56) References Cited

U.S. PATENT DOCUMENTS

| | | | | |
|---|---|---|---|---|
| 7,707,623 B2 * | 4/2010 | Cicchitto | ............. | H04L 63/105 726/4 |
| 8,255,973 B2 * | 8/2012 | Hopen | ................ | G06F 21/6218 709/217 |
| 8,429,708 B1 * | 4/2013 | Tandon | .................. | G06F 21/00 380/247 |
| 9,100,421 B2 * | 8/2015 | Greenlee | ................ | H04L 67/14 |
| 9,905,112 B1 * | 2/2018 | Krayer | ................. | G08B 21/182 |
| 9,912,704 B2 * | 3/2018 | Smith | ................... | H04L 63/101 |
| 9,972,024 B2 * | 5/2018 | Chan | .................. | G06Q 30/0201 |
| 10,033,700 B2 * | 7/2018 | Ouye | .................... | G06F 21/6209 |
| 2003/0088786 A1 * | 5/2003 | Moran | ................ | G06F 21/6218 726/4 |
| 2005/0278578 A1 * | 12/2005 | Buskens | .............. | G06F 9/4856 714/38.14 |
| 2006/0123485 A1 * | 6/2006 | Williams | ................ | G06F 21/10 726/27 |

(Continued)

OTHER PUBLICATIONS

Wikipedia contributors, "SAP HANA", https://en.wikipedia.org/w/index.php?title=SAP_HANA&oldid=766613324, Feb. 21, 2017, 3 pages.

(Continued)

*Primary Examiner* — Kambiz Zand
*Assistant Examiner* — Mahabub S Ahmed
(74) *Attorney, Agent, or Firm* — Harrity & Harrity, LLP

(57) ABSTRACT

A device may authenticate a user for access to a plurality of target systems. The device may provide information identifying the plurality of target systems. The device may receive information associated with a request for access to one or more target systems of the plurality of target systems. The device may determine whether the request for access complies with one or more policies associated with the one or more target systems. The device may deny the request for access. Denying the request for access may include foregoing providing access to the one or more target systems. The device may receive information associated with an escalation of the request for access based on denying the request for access. The device may provide access to the one or more target systems based on the information associated with the escalation of the request for access.

20 Claims, 8 Drawing Sheets

(56) References Cited

U.S. PATENT DOCUMENTS

| | | | | |
|---|---|---|---|---|
| 2006/0129587 A1* | 6/2006 | Renfro | G06F 21/604 | |
| 2007/0156694 A1* | 7/2007 | Lim | G06F 21/6218 | |
| 2008/0060080 A1* | 3/2008 | Lim | H04L 63/20 | 726/26 |
| 2009/0249440 A1* | 10/2009 | Platt | H04L 63/0815 | 726/1 |
| 2010/0011408 A1* | 1/2010 | Bhattacharyya | H04L 63/10 | 726/1 |
| 2011/0162057 A1* | 6/2011 | Gottumukkala | G06F 21/6218 | 726/8 |
| 2011/0231892 A1* | 9/2011 | Tovar | H04L 63/10 | 726/1 |
| 2011/0252459 A1* | 10/2011 | Walsh | G06F 21/33 | 726/4 |
| 2011/0258683 A1* | 10/2011 | Cicchitto | G06F 21/604 | 726/4 |
| 2012/0144448 A1* | 6/2012 | Gunawardena | G06F 16/1752 | 726/1 |
| 2012/0266258 A1* | 10/2012 | Tuchman | H04L 63/104 | 726/28 |
| 2013/0239172 A1* | 9/2013 | Murakami | G06F 21/42 | 726/1 |
| 2013/0283342 A1* | 10/2013 | Ellison | H04L 63/101 | 726/1 |
| 2013/0290369 A1* | 10/2013 | Sayers | H04L 67/22 | 707/769 |
| 2013/0297700 A1* | 11/2013 | Hayton | G06Q 10/10 | 709/204 |
| 2013/0346751 A1* | 12/2013 | Hannel | H04L 63/105 | 713/168 |
| 2014/0096241 A1* | 4/2014 | Li | H04L 63/12 | 726/22 |
| 2014/0098176 A1* | 4/2014 | Isaacs | H04W 4/60 | 348/14.01 |
| 2014/0137186 A1* | 5/2014 | Greenlee | G06F 21/60 | 726/3 |
| 2014/0189808 A1* | 7/2014 | Mahaffey | H04L 63/083 | 726/4 |
| 2014/0331273 A1* | 11/2014 | Koneru | H04L 63/20 | 726/1 |
| 2015/0242594 A1* | 8/2015 | Harjula | G06F 21/00 | 726/2 |
| 2015/0281239 A1* | 10/2015 | Brophy | H04L 63/10 | 726/4 |
| 2015/0319307 A1* | 11/2015 | Govindarajan | H04M 3/523 | 379/265.02 |
| 2016/0026813 A1* | 1/2016 | Neitzel | G06F 21/6218 | 726/17 |
| 2016/0034305 A1* | 2/2016 | Shear | G06F 16/245 | 707/722 |
| 2016/0065585 A1* | 3/2016 | Della Corte | H04L 63/108 | 726/4 |
| 2016/0315941 A1* | 10/2016 | Dang | H04L 51/04 | |
| 2016/0366183 A1* | 12/2016 | Smith | H04L 63/06 | |
| 2017/0006032 A1* | 1/2017 | Simpson | H04W 4/21 | |
| 2017/0054611 A1* | 2/2017 | Tiell | G06F 16/285 | |
| 2017/0195307 A1* | 7/2017 | Jones-McFadden | H04L 63/083 | |
| 2018/0063134 A1* | 3/2018 | Petrovykh | G06F 21/6245 | |
| 2018/0167374 A1* | 6/2018 | Hale | H04L 63/08 | |
| 2018/0173584 A1* | 6/2018 | Eckstein | G06F 11/0751 | |

OTHER PUBLICATIONS

Wikipedia contributors, "SAP Fiori", https://en.wikipedia.org/w/index.php?title=SAP_Fiori&oldid=763470163, Feb. 3, 2017, 2 pages.

* cited by examiner

AUTOMATED SYSTEM IDENTIFICATION, AUTHENTICATION, AND PROVISIONING

BACKGROUND

Business software or a business application is any software or set of computer programs that make up a company software environment and are used by business users to perform various business functions. Business applications are used to increase productivity, to measure productivity, and to perform other business functions accurately.

A database management system (DBMS) is a computer software application that interacts with the user, other applications, and a database itself to capture and analyze data. A general-purpose DBMS is designed to allow the definition, creation, querying, update, and administration of databases. One DBMS is an in-memory, column-oriented, relational DBMS. A primary function of this DBMS is as a database server to store and retrieve data as requested by the applications. In addition, this DBMS can perform advanced analytics (e.g., predictive analytics, spatial data processing, text analytics, text search, streaming analytics, and graph data processing) and includes Extract, Transform, Load (ETL) capabilities and an application server.

SUMMARY

According to some possible implementations, a device may include one or more processors. The one or more processors may authenticate a user for access to a plurality of target systems. The one or more processors may provide information identifying the plurality of target systems. The one or more processors may receive information associated with a request for access to one or more target systems of the plurality of target systems. The one or more processors may determine whether the request for access complies with one or more policies associated with the one or more target systems. The one or more processors may deny the request for access. Denying the request for access may include foregoing providing access to the one or more target systems based on determining that the request for access does not comply with the one or more policies. The one or more processors may receive information associated with an escalation of the request for access based on denying the request for access. The one or more processors may provide access to the one or more target systems based on the information associated with the escalation of the request for access.

According to some possible implementations, a method may include authenticating, by a device, a user for access to a plurality of web applications. The method may include providing, by the device, information identifying the plurality of web applications. The method may include receiving, by the device, information associated with a request for access to one or more web applications of the plurality of web applications. The method may include determining, by the device, whether the request for access complies with one or more policies associated with the one or more web applications. The method may include denying, by the device, the request for access based on determining that the request for access does not comply with the one or more policies. The method may include receiving, by the device, information associated with escalating the request for access based on denying the request for access. The method may include selectively providing, by the device, access to the one or more web applications after escalating the request for access.

According to some possible implementations, a non-transitory computer-readable medium may store instructions. The one or more instructions, when executed by one or more processors, may cause the one or more processors to provide, to a user, information identifying a plurality of applications. The one or more instructions, when executed by one or more processors, may cause the one or more processors to receive a request for access to an application of the plurality of applications. The one or more instructions, when executed by one or more processors, may cause the one or more processors to determine that the request for access complies with one or more policies associated with the application. The one or more instructions, when executed by one or more processors, may cause the one or more processors to approve the request for access to the application. The one or more instructions, when executed by one or more processors, may cause the one or more processors to provision access to the application based on approving the request for access. The one or more instructions, when executed by one or more processors, may cause the one or more processors to provide access to the application based on provisioning access.

DETAILED DESCRIPTION

Figure 1A:
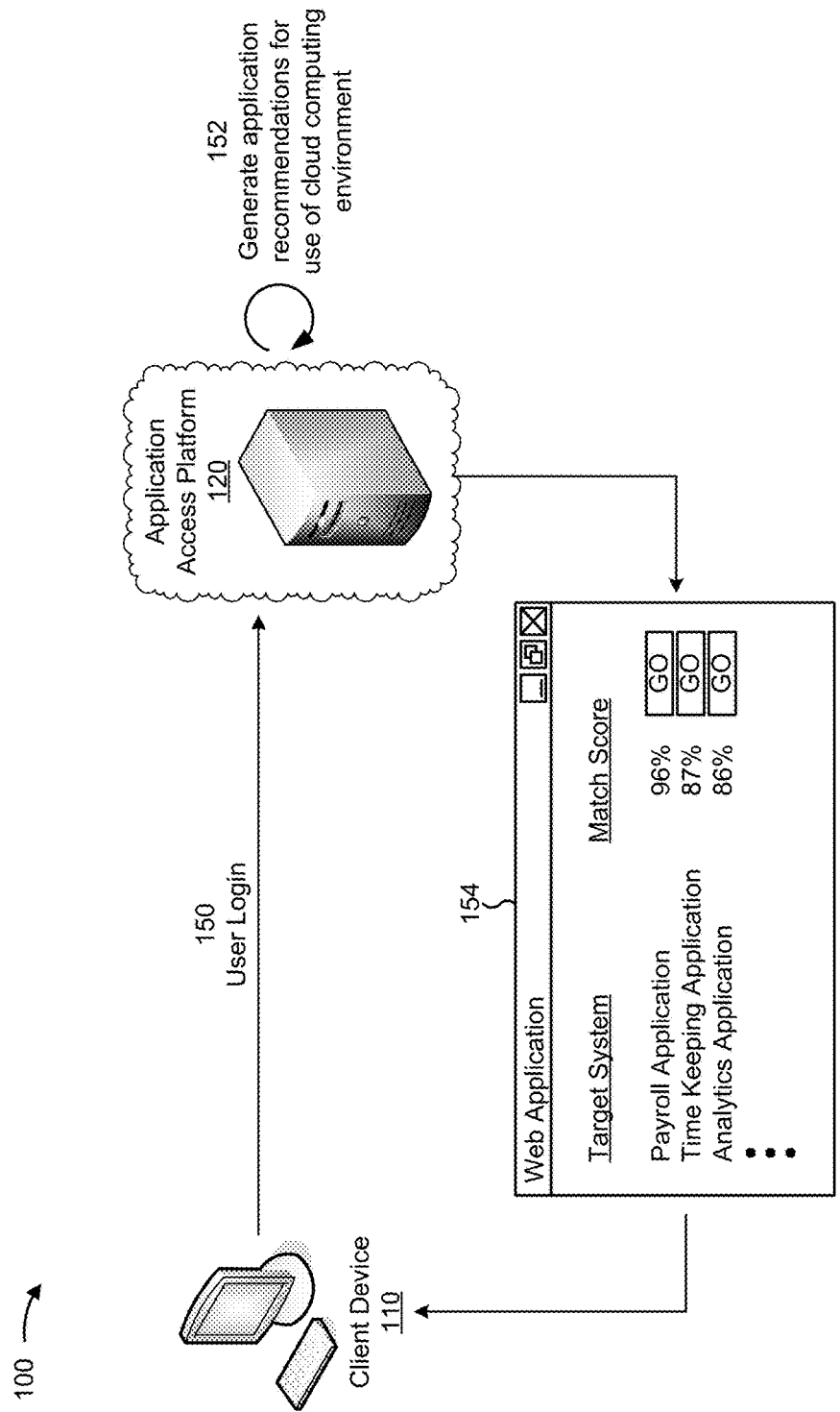
FIGS. 1A-1C are diagrams of an overview of an example implementation described herein.

The following detailed description of example implementations refers to the accompanying drawings. The same reference numbers in different drawings may identify the same or similar elements.

Business applications are generally developed to meet the needs of a specific organization (e.g., a company, a corporation, a business, a firm, etc.) and, therefore, may not be easily transferable to a different organization's software environment, unless the two organizations' business types and operations are identical. Applications may include timekeeping applications, information retrieval applications, report generation applications, etc. Due to the unique requirements of each organization, off-the-shelf software may not completely address an organization's needs. Where an on-the-shelf software solution is used, due to time or monetary considerations, some level of customization may be required. Further, applications may operate as web-based applications. Such applications are becoming more ubiquitous, in more fields, such as for databases.

The proliferation of business applications can lead to numerous applications being housed within an organization's software environment. In some cases, the number of applications could exceed 300,000 for, for example, a database management system (DBMS). An organization may also require compliance with security and information access policies relating to various legal and/or position specific requirements (e.g., requirements relating to the Sarbanes-Oxley Act, the Health Insurance Portability and Accountability Act (HIPAA), work assignments, job roles, etc.). With increased quantities of employees, it may be difficult to accurately search for, correctly track information associated with access to, approve access to, and provide access to the applications.

Implementations, described herein, provide an application access platform that may provide a user interface to automatically provide, for a user, recommendations relating to identifying applications (e.g., web applications) in an organization's software environment. The application access platform may also automatically approve and provision access to an application for a user based on user information and organization policies. Furthermore, the application access platform may store user profile information for a user and automatically update the user profile information as changes are made. The application access platform may automatically synchronize the user profile information across multiple applications in an organization's software environment. In addition, the user profile information may be associated with information regarding access to applications by a user and the application access platform may automatically provide access information to users, applications, or the like, of the organization's software environment by referring to the user profile information.

By automatically providing search queries and recommendations for applications, the application access platform may reduce network traffic as users do not need to manually search through multiple lists of applications to identify a relevant application. Further, by automatically approving and provisioning access to an application for a user, the application access platform may help to ensure compliance with security and other organization policies while also reducing network traffic relevant to transmitting a request for approval to a party that governs access (e.g., a supervisor) every time a user requests access to an application. In addition, by automatically approving access, the application access platform may reduce a likelihood of incorrectly approving access to applications, thus reducing computing resource utilization relative to users being required to audit and potentially revise access information regarding applications.

Moreover, by automatically synchronizing and utilizing user profile information across multiple applications, the application access platform may reduce network traffic, increase speed of information processing, and increase accuracy of information as users do not need to manually input and/or obtain as much information when accessing applications. Automatic synchronization of user profile information also reduces a likelihood that information is out-of-date, thereby reducing network traffic relative to requiring a user to manually update information to access an application.

Figure 1B:
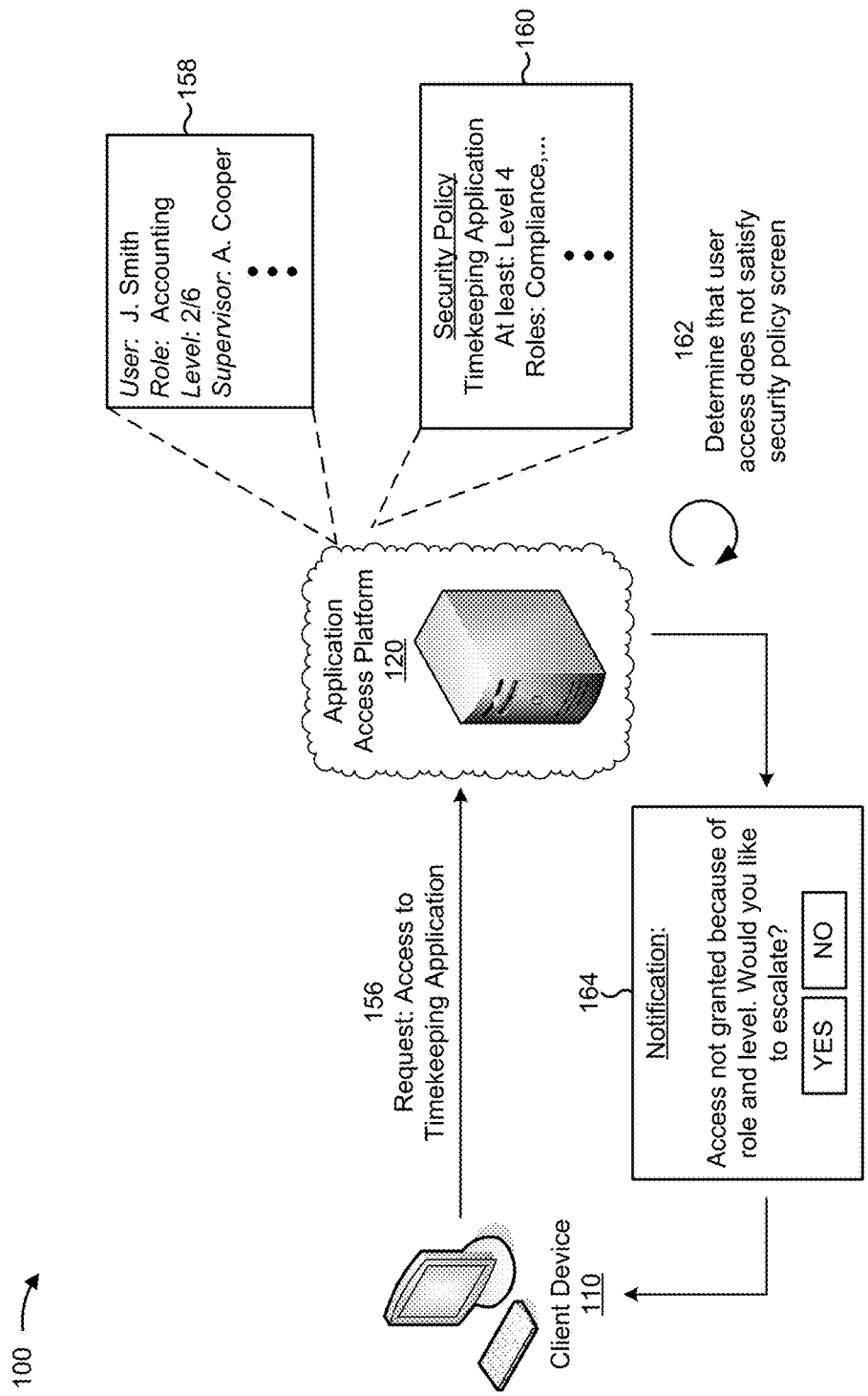
Figure 1C:
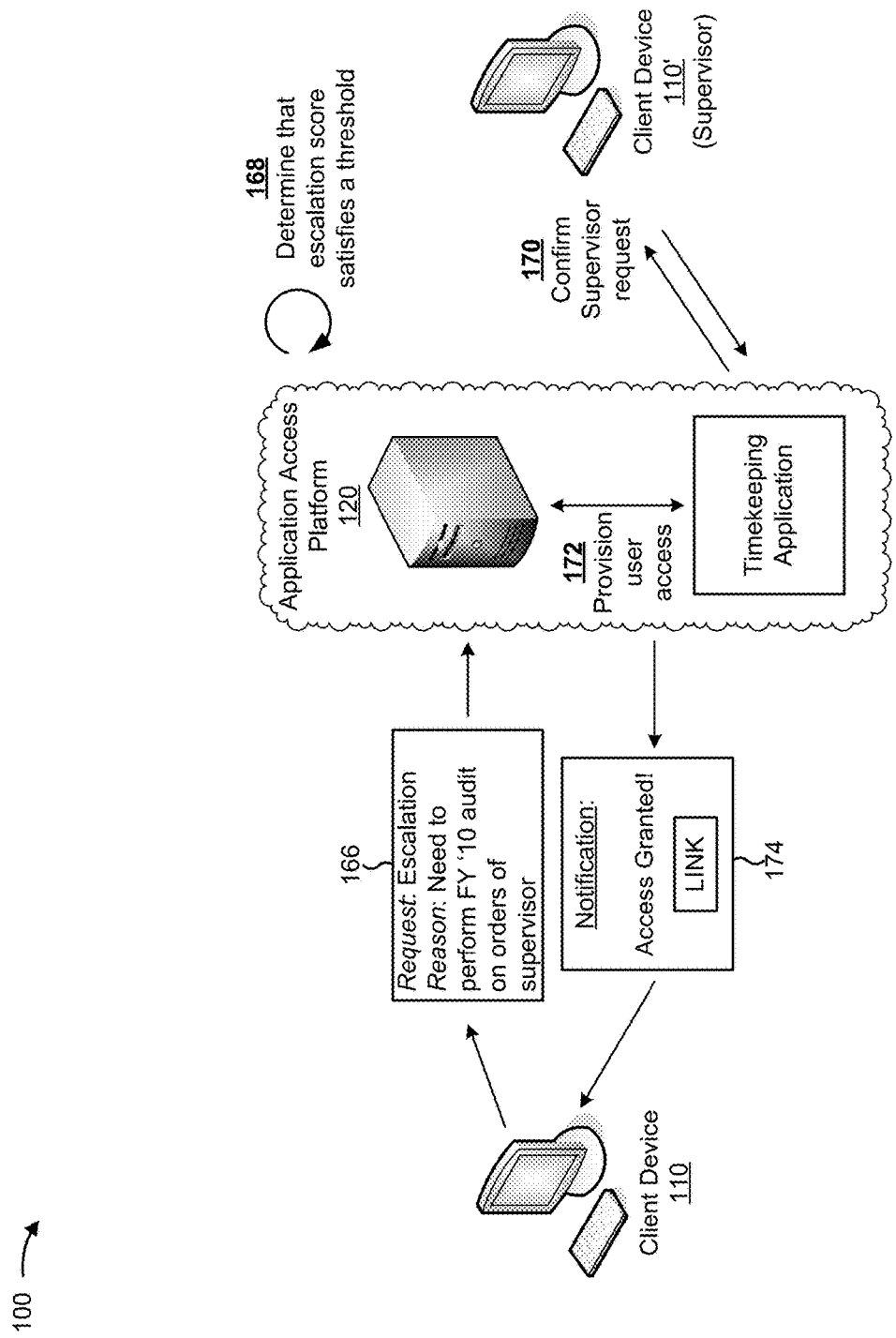

FIGS. 1A-1C are diagrams of an overview of an example implementation 100 described herein. As shown in FIG. 1A, example implementation 100 may include one or more client devices 110 and application access platform 120. According to FIG. 1A, assume a user, who is employed by a company, has been assigned the task of reviewing timekeeping records for other employees in the user's department. As shown by reference number 150 of FIG. 1A, the user of client device 110 may log into application access platform 120 and application access platform 120 may receive login information from the user. For example, the user may log into application access platform 120 to gain access to a timekeeping application. Based on the login information, application access platform 120 may authorize the user to view an index of target systems. The target systems may be applications that are part of the company's software environment which are accessible via application access platform 120.

As further shown in FIG. 1A, and by reference number 152, application access platform 120 may generate recommendations for applications (e.g., web applications, mobile applications, etc.) that may be of particular interest to the user. Recommendations may be based on the login information received from the user and/or other criteria. Application access platform 120 may generate the recommendations after receiving the login information from the user or application access platform 120 may prompt the user for additional information related to the criteria to make the recommendations.

As further shown in FIG. 1A, and by reference number 154, application access platform 120 may provide a user interface (UI) for display on the screen of client device 110. The UI includes a list of application identifiers (e.g., the names of applications) and a match score for each application. The match score may provide an indication of how much an application is recommended for the user based on the login information received from the user and/or other criteria. For example, when application access platform 120 determines that a user is relatively likely to intend to use a particular application, application access platform 120 may assign a relatively high match score. In contrast, when application access platform 120 determines that a user is relatively unlikely to intend to use a particular application, application access platform 120 may assign a relatively low match score. Although described herein in terms of relatively high and low match scores, other levels of match score may be possible.

By providing recommendations for applications, application access platform 120 may reduce network traffic and utilization of computing resources associated with unnecessary searching. Additionally, a user may be provided with a refined list of applications that are of particular relevance to the user with regard to the user's potential access to one or more of the applications. This may conserve personnel resources associated with accessing applications as well as resources of network devices that implement access functions for applications.

As shown in FIG. 1B, and by reference number 156, the user may make a request for access to the timekeeping application by selecting the corresponding application identifier shown in the UI of client device 110. In some implementations, application access platform 120 may prevent a user from requesting access to an application if a request for access was previously denied for that application (e.g., at any time in the past, within a particular amount of time, or the like). As shown by reference number 158, application access platform 120 may obtain job position information for the user (e.g., job role, level at company, name of user's supervisor, etc.) based on the selection of the timekeeping application. In some implementations, application access platform 120 may obtain the user's job position information from the user, via client device 110, or automatically from a database.

As shown by reference number 160, application access platform 120 may automatically obtain security policy information relating to a security policy of the company associated with the timekeeping application. As shown by reference number 162, application access platform 120 may determine that the user does not satisfy the security policy by comparing the job position information with the security policy information. As shown by reference number 164, application access platform 120 may provide a UI indicating that the user's request for access to the timekeeping application is denied. The UI may also provide the user with the ability to escalate the user's request for access to the timekeeping application since the request for access was denied. By escalating the request for access, the user may be requesting that a second party (e.g., the user's supervisor, an administrator, etc.) review the request for access to the timekeeping application.

By providing automatic screening for access to applications based on an organization's policies, application access platform 120 may reduce network traffic and utilization of computing resources associated with unnecessary storage, searching, and retrieval of policy information. Additionally, automatic screening based on an organization's policies may ensure that access to applications is granted accurately and efficiently.

As shown in FIG. 1C, and by reference number 166, client device 110 may escalate the request for access and client device 110 may receive a reason from the user as to why the user's access is being escalated. Assume that the user is requesting access based on an instruction from the user's supervisor. Application access platform 120 may analyze the reason to determine that the user is requesting access based on an instruction from the supervisor. As shown by reference number 168, application access platform 120 may determine an escalation score and may determine that the escalation score satisfies a threshold. The escalation score may provide an indication of whether the user's request for access to the timekeeping application should be provided to a second party for further review. In some implementations, the escalation score may be based on the reason provided by the user.

By determining whether a request for access should be escalated according to a threshold criteria, application access platform 120 may reduce network traffic and utilization of computing resources. In addition, allowing a user to escalate a request for access, as well as providing a reason for the request, may increase efficiency and accuracy in granting access to an application and reduce unauthorized or improperly granted access.

As shown by reference number 170, application access platform 120 may identify the user's supervisor and request confirmation (e.g., via the supervisor's client device 110') that the request for access should be granted. The supervisor may confirm that the request for access should be granted based on the request for confirmation from application access platform 120. As shown by reference numbers 172 and 174, application access platform 120 may provision user access to the timekeeping application and application access platform 120 may provide the user with a notification that access has been granted based on the supervisor's confirmation. The notification may include a link to the timekeeping application that may allow the user to gain immediate access to the timekeeping application by selecting the link. This conserves computing resources relative to requiring the user to have to navigate to and separately log into the timekeeping application.

As indicated above, FIGS. 1A-1C are provided merely as an example. Other examples are possible and may differ from what was described with regard to FIGS. 1A-1C.

Figure 2A:
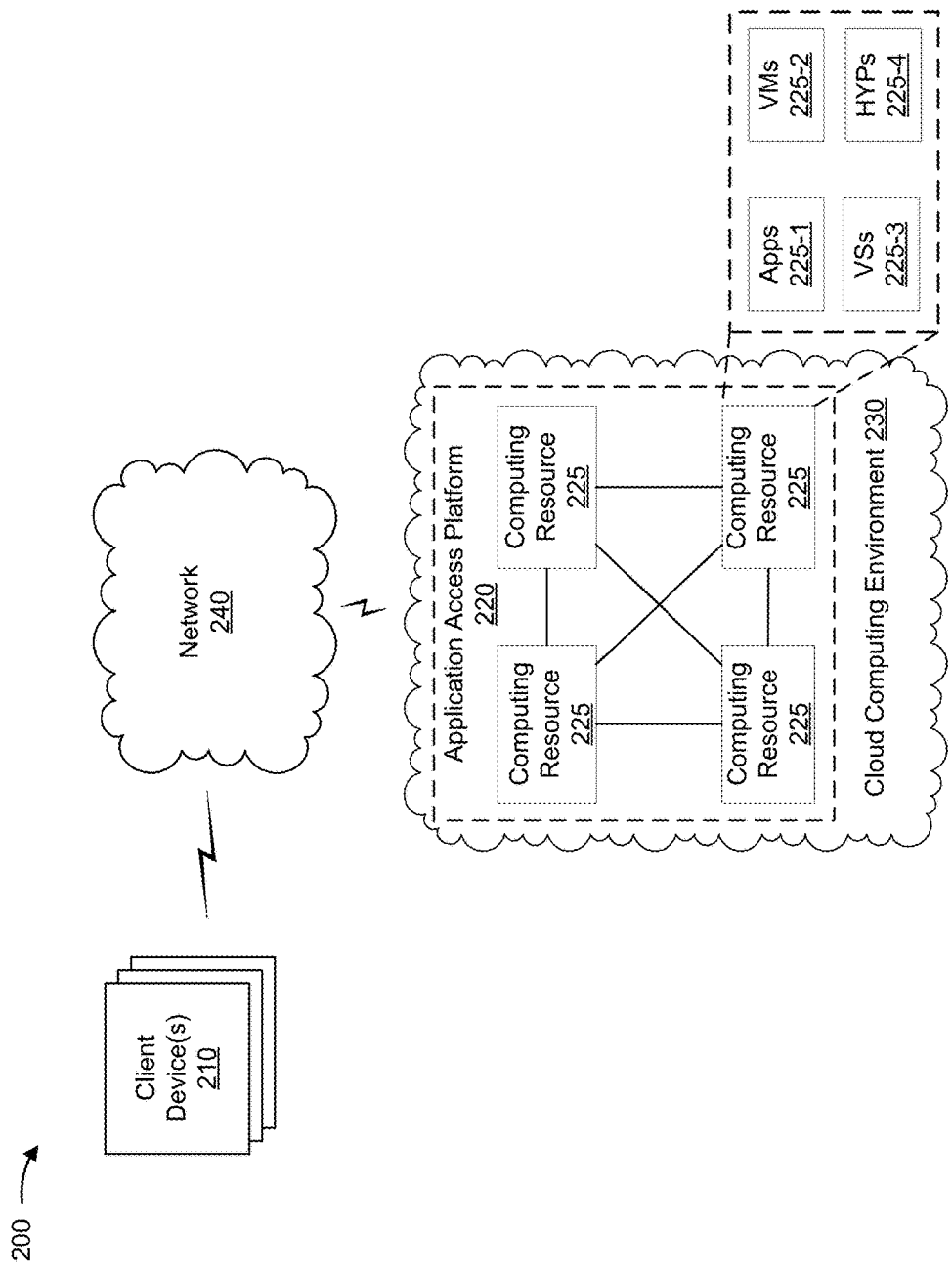
FIG. 2A is a diagram of an example environment in which systems and/or methods, described herein, may be implemented.

FIG. 2A is a diagram of an example environment 200 in which systems and/or methods, described herein, may be implemented. As shown in FIG. 2A, environment 200 may include one or more client devices 210, application access platform 220, cloud computing environment 230, and network 240. Devices of environment 200 may interconnect via wired connections, wireless connections, or a combination of wired and wireless connections.

Client device 210 includes one or more devices capable of receiving, generating, storing, processing, and/or providing information associated with a set of target systems and/or information associated with a user, as described elsewhere herein. For example, client device 210 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device. In some implementations, client device 210 may provide a user interface, such as a web application based user interface or the like, to identify an application, to provide information associated with the application, and/or to access the application. In some implementations, client device 210 corresponds to client device 110 or client device 110' shown in FIGS. 1A-1C.

Application access platform 220 includes one or more devices capable of obtaining information relating to a target system and/or a user, as described elsewhere herein. For example, application access platform 220 may include a cloud server or a group of cloud servers. In some implementations, application access platform 220 may be designed to be modular such that certain software elements or hardware components can be swapped in or out depending on a particular need. As such, application access platform 220 may be easily and/or quickly reconfigured for different uses. In some implementations, application access platform 220 may be hosted in cloud computing environment 230. Notably, while implementations described herein describe application access platform 220 as being hosted in cloud computing environment 230, in some implementations, application access platform 220 may not be cloud-based (i.e., may be implemented outside of a cloud computing environment) or may be partially cloud-based. In some implementations, application access platform 220 corresponds to application access platform 120 shown in FIGS. 1A-1C.

Cloud computing environment 230 includes an environment that hosts application access platform 220. Cloud computing environment 230 may provide computation, software, data access, storage, etc. services that do not require end-user (e.g., client device 210) knowledge of a physical location and configuration of system(s) and/or device(s) that hosts application access platform 220. As shown, cloud computing environment 230 may include a group of computing resources 225 (referred to collectively as "computing resources 225" and individually as "computing resource 225").

Computing resource 225 includes one or more personal computers, workstation computers, server devices, or another type of computation and/or communication device. In some implementations, computing resources 225 may host application access platform 220. Computing resources 225 may include compute instances executing in computing resources 225, storage devices provided by computing resources 225, data transfer devices provided by computing resources 225, or the like. In some implementations, one computing resource 225 may communicate with another computing resource 225 via wired connections, wireless connections, or a combination of wired and wireless connections.

As further shown in FIG. 2A, computing resource 225 includes a group of cloud resources, such as one or more applications ("Apps" or "App") 225-1, one or more virtual machines ("VMs" or "VM") 225-2, one or more virtualized storages ("VSs" or "VS") 225-3, and/or one or more hypervisors ("HYPs" or "HYP") 225-4.

App 225-1 includes one or more software applications that may be provided to or accessed by client device 210. App 225-1 may eliminate a need to install and execute software applications on client device 210. For example, App 225-1 may include software associated with application access platform 220 and/or any other software capable of being provided via cloud computing environment 230. In some implementations, one App 225-1 may send/receive information to/from one or more other Apps 225-1, via VM 225-2. In some implementations, Apps 225-1 may include a set of applications associated with a database management system (DMS) operating on, or operating in association with, application access platform 220. For example, Apps 225-1 may include document applications, spreadsheet applications, timekeeping applications, payroll applications, engineering applications, human resources applications, or the like.

VM 225-2 includes a software implementation of a machine (e.g., a computer) that executes programs like a physical machine. For example, VM 225-2 may be either a system virtual machine or a process virtual machine, depending upon use and degree of correspondence to any real machine by VM 225-2. A system virtual machine may provide a complete system platform that supports execution of a complete operating system ("OS"). A process virtual machine may execute a single program, and may support a single process. In some implementations, VM 225-2 may execute on behalf of a user (e.g., client device 210), and may manage infrastructure of cloud computing environment 230, such as data management, synchronization, or long-duration data transfers.

VS 225-3 includes one or more storage systems and/or one or more devices that use virtualization techniques within the storage systems or devices of computing resource 225. For example, within the context of a storage system, types of VS 225-3 may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations. In some implementations, data may be stored in a structured or unstructured format, and processing may be applied to convert between a structured and unstructured format for utilization in computations. Unstructured data may include log data from monitoring of project management tools, social media data sources, or the like (e.g., quantitative data, qualitative data, etc. regarding a project, a set of employees, or the like).

HS 225-4 provides hardware virtualization techniques that allow multiple operating systems (e.g., "guest operating systems") to execute concurrently on a host computer, such as computing resource 225. For example, HS 225-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, etc.), a public land mobile network (PLMN), a local area network (LAN), a wide area network (WAN), a metropolitan area network (MAN), a telephone network (e.g., the Public Switched Telephone Network (PSTN)), a next-generation network (NGN), a private network, an ad hoc network, an intranet, the Internet, a fiber optic-based network, a cloud computing network, or the like, and/or a combination of these or other types of networks.

The number and arrangement of devices and networks shown in FIG. 2A are provided as an example. In practice, there may be additional devices and/or networks, fewer devices and/or networks, different devices and/or networks, or differently arranged devices and/or networks than those shown in FIG. 2A. Furthermore, two or more devices shown in FIG. 2A may be implemented within a single device, or a single device shown in FIG. 2A may be implemented as multiple, distributed devices. Additionally, or alternatively, a set of devices (e.g., one or more devices) of environment 200 may perform one or more functions described as being performed by another set of devices of environment 200.

Figure 2B:
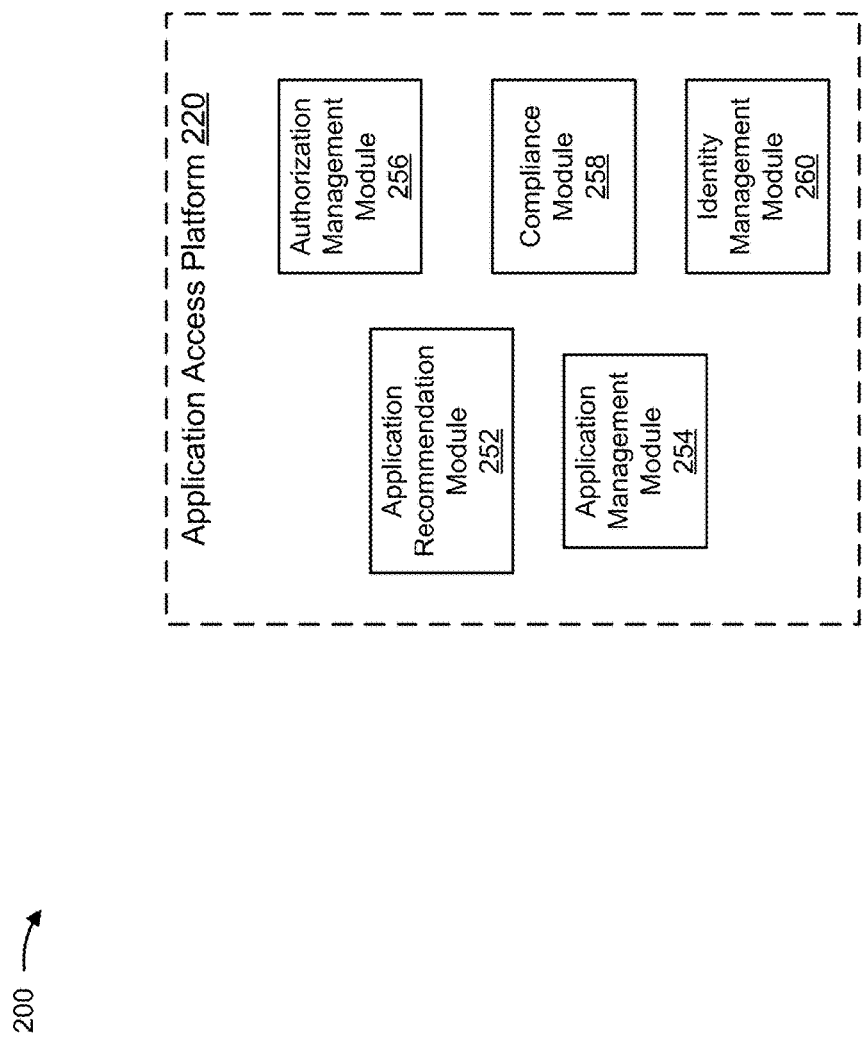
FIG. 2B is a diagram of example functional modules of application access platform of FIG. 2A.

FIG. 2B is a diagram of example functional modules of application access platform 220. Each of the functional modules may be implemented by one or more computing resources 225. In other words, the functional modules may be implemented by a single computing resource 225 or by multiple computing resources 225. Similarly, a single functional module may be implemented by a single computing resource 225 or by multiple computing resources 225.

As shown in FIG. 2B, application access platform 220 may include one or more functional modules, such as an application recommendation module 252, an application management module 254, an authorization management module 256, a compliance module 258, and an identity management module 260. Each of these functional modules can be implemented by one or more processors (e.g., in hardware, firmware, or software executing on hardware).

Application recommendation module 252 may provide information associated with a set of applications, such as Apps 225-1. For example, application recommendation module 252 may determine a recommendation of one or more applications for a user, and may generate or populate a user interface to provide information identifying the recommended application(s). In some implementations, application recommendation module 252 may generate the recommendation for one more applications based on applicable criteria (e.g., as discussed above).

In some implementations, application recommendation module 252 may generate a recommendation for an application, such as a web application, based on user information regarding a user, user information regarding other similar users (e.g., employees of a common company associated with a similar role, a similar seniority, a similar compensation, etc.), application information regarding applications (e.g., how many users request an application, whether the application is new or updated, application use frequency, etc.), or the like. In some implementations, application recommendation module 252 may utilize an analytical technique to perform the recommendation, such as machine learning, deep analytics, etc. regarding the applications, a user, user utilization of a company system (e.g., on which the applications are stored), etc.

In some implementations, application recommendation module 252 may automatically trigger assignment of an application to a user and initiate providing access to the user. For example, when a new application is added to a set of applications and application recommendation module 252 determines a threshold likelihood that the application is relevant to a user, application recommendation module 252 may initiate providing access to the application. In this case, if a policy violation does not exist for the application or if an escalation overcomes the policy violation, the application may be automatically added to a set of applications available to a user, and the user may be provided a notification regarding the application.

Application management module 254 may manage applications, such as Apps 225-1, for application access platform 220. For example, based on application access platform 220 determining that a particular user is to be authenticated for user access to a particular application, and based on application access platform 220 provisioning the particular application to enable the user access, application management module 254 may distribute the application for user access. In this case, application management module 254 may cause the user access to the application to be provided in a user interface, such as a web browser, provided via client device 210. In some implementations, application management module 254 may periodically perform a security check associated with an application to ensure compliance with an organization policy, application management module 254 may cause compliance module 258 to update an organization policy for an application, or the like.

Authorization management module 256 may manage authorization for user access to applications, such as Apps 225-1, of application access platform 220. For example, authorization management module 256 may utilize a set of application program interface (API) calls associated with a database management system operating on, or in association with, application access platform 220 to manage a set of roles of an App 225-1 and/or assign a particular role to a user. In some implementations, authorization management module 256 may operate in real time. In some implementations, based on application access platform 220 determining that a user is to be authenticated for user access to an application, authorization management module 256 may perform a set of API calls associated with roles of the application to provision user access to the application.

Compliance module 258 may manage an organization policy. For example, compliance module 258 may provide functionalities, such as governance, enterprise risk management (ERM), internal controls, regulatory compliance, internal auditing, or the like. In some implementations, compliance module 258 may receive information identifying an organization policy associated with a particular application, such as a particular App 225-1, and may determine whether attributes of a particular user satisfy the organization policy.

Identity management module 260 may manage information associated with user profiles for a set of users. For example, identity management module 260 may communicate with a set of data structures, such as human resources data structures, user profiles, time management data structures, or the like, to obtain information regarding the set of users. In some implementations, identity management module 260 may provide information associated with a user for utilization in determining whether attributes associated with the user satisfy an organization policy for user access to an application, such as App 225-1. In some implementations, identity management module 260 may provide and/or obtain information associated with a user based on API calls.

The number and arrangement of functional modules shown in FIG. 2B are provided as an example. In practice, application access platform 220 may include additional functional modules, fewer functional modules, different functional modules, or differently arranged functional modules than those shown in FIG. 2B. Additionally, or alternatively, a set of functional modules (e.g., one or more functional modules) of application access platform 220 may perform one or more functions described as being performed by another set of functional modules of application access platform 220.

Figure 3:
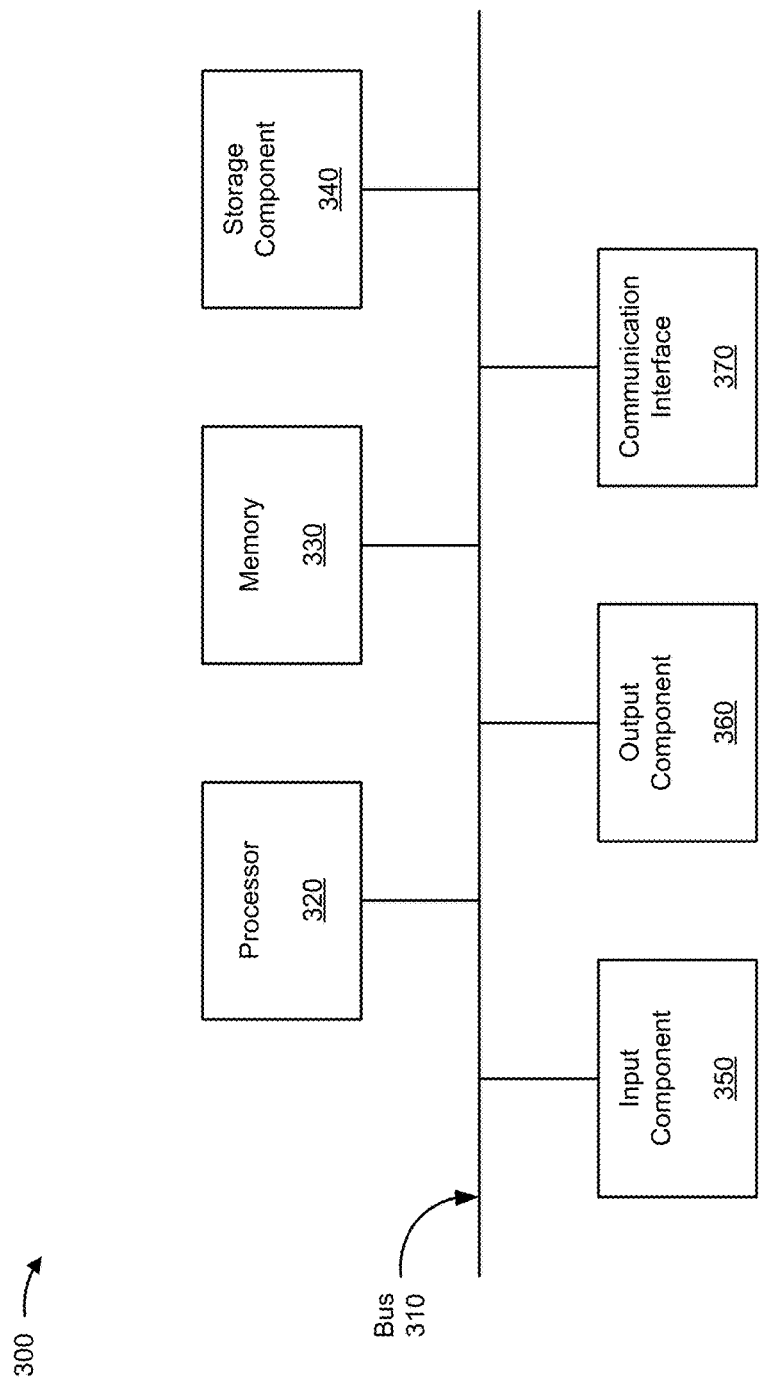
FIG. 3 is a diagram of example components of one or more devices of FIG. 2A.

FIG. 3 is a diagram of example components of a device 300. Device 300 may correspond to client device 210, application access platform 220, and/or computing resource 225. In some implementations, each of client device 210, application access platform 220, and computing resource 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
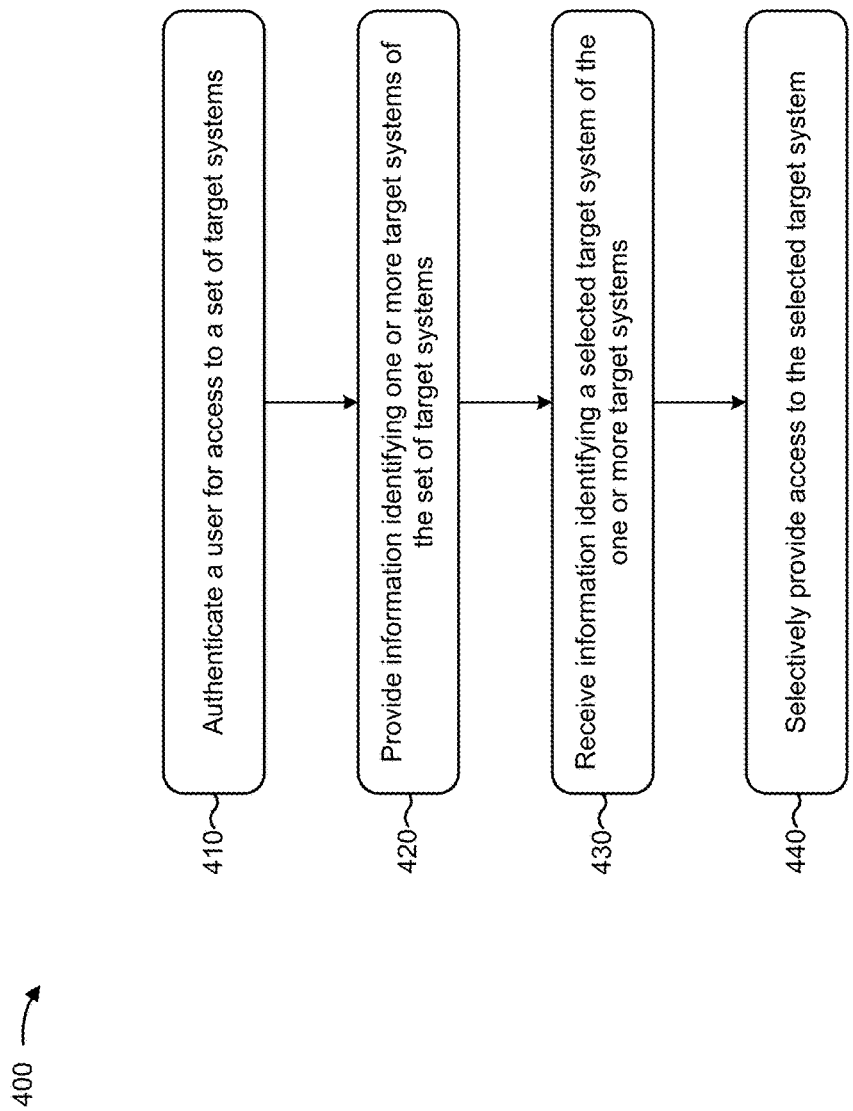
FIG. 4 is a flow chart of an example process for providing access to a target system in an organization's software environment.

FIG. 4 is a flow chart of an example process 400 for providing access to a target system in an organization's software environment. In some implementations, one or more process blocks of FIG. 4 may be performed by application access platform 220. In some implementations, one or more process blocks of FIG. 4 may be performed by another device or a group of devices separate from or including application access platform 220, such as client device 210.

As shown in FIG. 4, process 400 may include authenticating a user for access to a set of target systems (block 410). For example, application access platform 220 may receive information from a user via client device 210 during a login process and application access platform 220 may use the information for authentication of a user for access to a set of target systems. In some implementations, application access platform 220 may generate a user interface (UI) and provide the UI for display on client device 210 to receive user input as part of the login process. The user input may include user identification information, such as information identifying a username, a password, an employee identification number, a device identifier (e.g., internet protocol (IP) address, media access control (MAC) address, etc.), a phone number, an office location, an office address, a home address, or the like.

In some implementations, the set of target systems includes a plurality of applications (e.g., a plurality of Apps 225-1). In some implementations, the set of target systems may include hundreds, thousands, or millions of applications. In some implementations, a target system may include one or more applications. For example, a target system relating to accounting may include multiple accounting-related applications, such as a time entry application, an accounts payable application, an accounts receivable application, a payroll application, or the like. While the set of target systems will be described as applications, target systems, as used herein, may include systems other than applications, such as hardware systems, computer systems, or the like.

In some implementations, the login process may include a user logging into a computer system, a website, an account, a software platform, a network, an organization's intranet, or the like. For example, a user may log into application access platform 220 via client device 210. In some implementations, application access platform 220 may receive a login request from client device 210 via a cloud connector module and/or via one or more firewalls associated with application access platform 220. In some implementations, application access platform 220 may receive user identification information and may authenticate the user based on the user identification information as part of the login process. For example, the login request may include user identification information and application access platform 220 may use all or a portion of the user identification information to authenticate the user.

In some implementations, application access platform 220 may receive the login request and perform an operation based on the login request. For example, application access platform 220 may determine whether the user identification information, provided as part of the login request, matches existing user identification information stored in a data structure. Application access platform 220 may provide a response to client device 210 indicating that the user has successfully logged in or that the user identification information provided as part of the login request does not match existing user identification information stored in the data structure.

In some implementations, application access platform 220 may create a user profile based on the user identification information. For example, if a user that is logging in is determined to be a new user, application access platform 220 may create a user profile and store the user profile in a data structure. In some implementations, application access platform 220 may create a user profile for an application, for a plurality of applications, for the organization's software environment, or the like. In some implementations, application access platform 220 may create and/or revise a user profile based on information received from identity management module 260.

In some implementations, application access platform 220 may obtain user identification information to determine that the user is authenticated for access to an application. For example, a user may provide, via client device 210, a device identifier to application access platform 220 and application access platform 220 may determine the user's identity via identity management module 260 based on the device identifier. Application access platform 220 may determine that the user's identity is associated with an application in identity management module 260 and may authenticate the user for access to the application. In some implementations, application access platform 220 may obtain user identification information as part of or following a login process.

In some implementations, application access platform 220 may use an application programming interface (API) call to identify and/or authenticate a user. For example, application access platform 220 may perform an API call using an API of identity management module 260 to identify the user, an API call to authorization management module 256 to authenticate the user, or the like.

In some implementations, application access platform 220 may interact with a device outside of application access platform 220 to identify and/or authenticate a user. For example, application access platform 220 may establish a session with a social media application server storing user information regarding a set of users of a social media service and send, as part of the session, user identification information to the device. Application access platform 220 may cause the social media application server to perform an operation to identify and/or authenticate the user and provide, to application access platform 220, a result of performing the operation. This conserves computing resources of application access platform 220 by offloading the operation to identify and/or authenticate to another device rather than consuming computing resources to perform the operation.

In this way, application access platform 220 may authenticate a user for access to a set of target systems.

As further shown in FIG. 4, process 400 may include providing information identifying one or more target systems of the set of target systems (block 420). For example, application access platform 220 may provide a list of application identifiers, for the applications associated with the one or more target systems, to a user via a UI on client device 210. In some implementations, the applications may be a subset of all applications in an organization's software environment (i.e., one or more applications in the organization's software environment). For example, application access platform 220 may receive information associated with the applications during a process of indexing all applications in the organization's software environment. Application access platform 220 may use that information to determine the subset of all applications. In some implementations, the applications may include all applications in the organization's software environment.

In some implementations, application access platform 220 may periodically index the applications. In some implementations, the information associated with the applications may be received from and/or stored in a data structure, such as an application catalogue, an application repository, an application database, or the like. In some implementations, application access platform 220 may perform a data acquisition technique (e.g., a web crawling technique, a web scraping technique, a data mining technique, a web searching technique, a database searching technique, etc.), and receive the information associated with the applications based on performing the data acquisition technique. In some implementations, application access platform 220 may provide requests to information sources that are external to application access platform 220 (e.g., external data structures, external server devices, etc.) for the information associated with the applications.

In some implementations, the information associated with an application may include information about the type of application, the functions of the application, who typically uses the application (e.g., a name of a user, a position of a user, etc.), the requirements for accessing (e.g., a user level, a job role, a position of a user, etc.) the application, the version of the application, the length of service of the application, whether the application is custom or standard, whether the application is newly created, or the like. An application may be newly created if the application was created following the most recent time application access platform 220 provided information associated with the applications to the user.

In some implementations, application access platform 220 may provide information identifying acceptances and/or rejections of requests for access to an application of the applications. For example, application access platform 220 may provide a user interface (UI) to client device 210 that includes a list of application identifiers with a rate of acceptance and/or rejection for each application. In some implementations, the information identifying acceptances and/or rejections of requests for access may include a rate of acceptance and/or rejection associated with the user. In some implementations, application access platform 220 may provide information identifying one or more applications to which the user has previously been granted access and/or to which the user has previously been denied access.

In some implementations, application access platform 220 may obtain information regarding user preferences. Information regarding the user preferences may include user identification information for a user, previous requests for access from the user, results of previous requests for access from the user, information identifying a work assignment of the user, or the like.

In some implementations, application access platform 220 may obtain the information regarding user preferences from a user via client device 210 and/or automatically from a data structure. For example, application access platform 220 may provide a user interface (UI) on client device 210 and may receive a request for access that includes user identification information. In some implementations, application access platform 220 may parse the request for access using a searching technique (e.g., keyword searching, etc.), a natural language processing (NLP) technique, or the like to obtain information regarding user preferences. For example, application access platform 220 may obtain text from the request for access and prepare the text for processing to identify items. In some implementations, application access platform 220 may determine text sections to be processed. For example, application access platform 220 may determine a manner in which the text is to be partitioned into text sections, and application access platform 220 may partition the text into text sections. A text section may include, for example, a sentence, a line, a paragraph, a table, a page, a document, a term, or the like. In some implementations, application access platform 220 may process each text section separately (e.g., serially or in parallel).

In some implementations, application access platform 220 may identify items included in the text, and generate a corpus of items by generating a data structure that stores items extracted from the text. For example, application access platform 220 may generate a database of information regarding user preferences for the user. In some implementations, an item may include a set of terms. For example, a term may refer to a set of characters, such as a single character, multiple characters (e.g., a character string), a combination of characters that form multiple words (e.g., a multi-word term, such as a phrase, a sentence, or a paragraph), a combination of characters that form an acronym, a combination of characters that form an abbreviation of a word, a combination of characters that form a misspelled word, or the like.

By generating the data structure that stores items extracted from the text, application access platform 220 may process the text more efficiently than if the text was processed without first generating the data structure, thereby conserving processor and/or memory resources.

In some implementations, application access platform 220 may automatically obtain information regarding user preferences from a functional module (e.g., identity management module 260) of application access platform 220. In some implementations, application access platform 220 may automatically obtain information (e.g., user identification information, address, phone number, social security number, personal photograph, fingerprint, job position information, password, etc.) from a user profile. In some implementations, application access platform 220 may obtain the information from an external source. For example, application access platform 220 may provide requests to information sources that are external to application access platform 220 (e.g., external data structures, external server devices, etc.) for the information. In some implementations, application access platform 220 may parse information from the external source (e.g., NLP of social media account, etc.) to obtain the information regarding user preferences.

In some implementations, application access platform 220 may determine one or more of the applications that the user is likely to be interested in. For example, application access platform 220 may determine the one or more applications based on information associated with the user (e.g., information regarding user preferences, user identification information, job position information, the user's prior usage of an application and/or combination of applications, office location, whether access to an application has been set up for the user other users of the application, etc.) and/or the one or more applications (e.g., application usage, applications previously determined to be beneficial to a job, etc.). Additionally or alternatively, application access platform 220 may determine the one or more applications based on information associated other users (e.g., information associated with users with similar job positions as the user, all users having access to an application, etc.).

In some implementations, application access platform 220 may determine the one or more applications based on user preference information obtained automatically by application access platform 220. In some implementations, application access platform 220 may determine the one or more applications based on user identification information received during the login process. For example, application access platform 220 may use a device identifier associated with client device 210 to determine that an application may or may not be able to run on client device 210.

In some implementations, application access platform 220 may determine the one or more applications based on performing a computer-implemented technique. For example, application access platform 220 may use one or more machine learning techniques to analyze data (e.g., training data, such as information that is associated with the user and/or the applications, etc.) and create one or more models associated with the applications. The computer-implemented techniques may include, for example, supervised and/or unsupervised techniques, such as artificial networks, case-based reasoning, Bayesian statistics, learning automata, Hidden Markov Modeling, linear classifiers, quadratic classifiers, decision trees, association rule learning, or the like. In some implementations, the data used to train a model is associated with a first organization and the model is used to determine one or more applications associated with a second organization that is different from the first organization.

Additionally, or alternatively, application access platform 220 may use another kind of computer-implemented technique, such as artificial intelligence, machine perception, or computer vision, to analyze data and generate models associated with the applications. For example, application access platform 220 may receive information associated with a user and/or the applications and may implement a computer-implemented technique (e.g., to train a model). Application access platform 220 may also receive additional information (e.g., additional information associated with the user and/or the applications) and may determine the one or more applications based on the model. Additionally, or alternatively, application access platform 220 may implement big data analytics techniques (e.g., analyzing thousands, millions, or billions of data points (e.g., information associated with a user and/or the applications, intra organization requirements, information related to date and/or time of business cycles, etc.)) to train the model and/or determine the one or more applications.

By determining the one or more applications that the user is likely to be interested in based on performing a computer-implemented or big data analytics technique, application access platform 220 may increase the efficiency of the process of making a recommendation of the one or more applications, reducing an amount of processing associated with making the recommendation, and increase the accuracy of the recommendation (e.g., by identifying similarities between data points within a dataset). Accordingly, implementations described herein may conserve processor and/or memory resources of application access platform 220 and/or data structures associated with making recommendations of applications.

In some implementations, application access platform 220 may generate a ranking and/or a match score indicating how likely the user is to select the one or more applications. The ranking and/or the match score may be based on information associated with the user (e.g., information regarding user preferences, user identification information, job position information, the user's prior usage of an application and/or combination of applications, office location, whether access to an application has been set up for the user or other users of the application, etc.) and/or the one or more applications (e.g., application usage, applications previously determined to be beneficial to a job, etc.). Additionally or alternatively, application access platform 220 may determine the ranking and/or the match score based on information associated other users (e.g., information associated with users with similar job positions as the user, all users having access to an application, etc.). In some implementations, application access platform 220 may apply different weights to the criteria that are used in determining the ranking and/or the match score. For example, the frequency of use of an application may be given more weight than the amount of data received during use of the application. In some implementations, application access platform 220 may generate the ranking and/or the match score using a technique (e.g., a computer-implemented technique, a big data analytics technique, etc.), such as one of the techniques discussed above.

By automatically providing a user with recommendations of the one or more applications, application access platform 220 reduces network traffic, computing resource utilization, delay, cost, etc. associated with the user trying to an application to access out of the hundreds, thousands, or millions of possible applications. Furthermore, by automatically providing the user with recommendations of one or more applications, application access platform 220 may more accurately identify an application that is relevant to a user, which may reduce requests for access to inappropriately identified applications.

In some implementations, application access platform 220 may generate a UI identifying the one or more applications. For example, application access platform 220 may generate a UI that includes a list of application identifiers for the one or more applications. Application access platform 220 may provide the UI to client device 210 for display to the user. In some implementations, the list may be ordered based on criteria associated with the user and/or the one or more applications (e.g., likelihood of user interest in the one or more applications, alphabetical order of the one or more applications, most recent use of the one or more application by the user, etc.). In some implementations, the UI may provide an indication of a recommendation of a particular application of the one or more applications.

In some implementations, application access platform 220 may determine the one or more applications to include in the UI based on the ranking and/or the match score. For example, application access platform 220 may include, in the UI, an application that has a score that satisfies a threshold, a threshold quantity of applications with the highest scores (e.g., top ten, top twenty, top thirty, etc.), or the like. In some implementations, application access platform 220 may provide the UI to client device 210 for display to the user. For example, application access platform 220 may provide the UI to client device 210 following a successful login process. In some implementations, application access platform 220 may provide the UI as part of a web application.

In this way, application access platform 220 may provide information identifying one or more target systems of the set of target systems.

As shown in FIG. 4, process 400 may include receiving information identifying a selected target system of the one or more target systems (block 430). For example, application access platform 220 may receive information identifying a selected application, associated with a selected target system, of the one or more applications, associated with the one or more target systems, based on a user's input to a user interface (UI) provided via client device 210. In some implementations, application access platform 220 may receive information associated with a user selection of a UI element displayed by the UI on a screen of client device 210. For example, based on client device 210 detecting a user interaction with a user interface, client device 210 may provide an indication of the user selection to application access platform 220. The UI element may correspond to a selected application of the one or more applications that were recommended to the user.

In some implementations, the information identifying the selected application may include information identifying a computer system on which the selected application runs. For example, if the selected application runs in multiple operating systems, application access platform 220 may receive information indicating an operating system in which the selected application is used. In some implementations, the information identifying the computer system may be provided with the information identifying the selected application or may be provided separately (e.g., after, before, etc.) from the information identifying the selected application.

In some implementations, application access platform 220 may automatically select an application of the one or more applications for the user without receiving an input from the user. For example, application access platform 220 may use a computer-implemented technique (e.g., artificial intelligence, machine perception, computer vision, etc.) based on information associated with the user to automatically select an application for the user. For example, application access platform 220 may use a computer vision technique to select an application based on information in an introductory screen of the application, symbols associated with the application, or the like. In some implementations, application access platform 220 may automatically select an application based on the ranking and/or the match score satisfying a threshold.

In some implementations, application access platform 220 may provide information to the user via the UI on client device 210 that indicates application access platform 220 has automatically selected an application for the user. For example, application access platform 220 may provide, via the UI, an introduction screen for the application that was automatically selected. In some implementations, application access platform 220 may automatically select the application for the user and then provide a prompt to the user to confirm that the selected application is an application the user would like to access. For example, application access platform 220 may present a screen to the user via the UI on client device 210 that provides two UI elements (e.g., a "yes" box and a "no" box) to confirm that an automatically selected application is the application the user would like to access.

By automatically selecting an application of the one or more applications, application access platform 220 may reduce network traffic, computing resource utilization, delay, cost, etc. relative to the user selecting an application that is inappropriate for the user.

In some implementations, application access platform 220 may forego providing with the user with access to the selected application unless application access platform 220 receives a response to the prompt from the user. In some implementations, application access platform 220 may provide the prompt to the user for a predetermined time period (e.g., 5 seconds, 10 seconds, 20 seconds, etc.) and then application access platform 220 proceeds with or foregoes providing access to the selected application if no response to the prompt is received within the predetermined time period.

In some implementations, application access platform 220 may receive a request for access to the selected application based on the selection of the application. For example, application access platform 220 may receive the request for access to the selected application based on the user selecting a UI element corresponding to the application in the UI on client device 210. In some implementations, application access platform 220 may provide a prompt to the user via the UI on client device 210 to provide information for the request for access to the selected application. For example, the prompt may request the user to provide information associated with the user that was not previously received and is beneficial for determining whether to provide access to the selected application.

In this way, application access platform 220 may receive information identifying a selected target system of the one or more target systems.

As further shown in FIG. 4, process 400 may include selectively providing access to the selected target system (block 440). For example, application access platform 220 may determine the selected application, associated with the selected target system, for which to provide access based on the user's request for access. Application access platform 220 may verify that the request for access to the selected application complies with an organization policy. In some implementations, application access platform 220 may provision access to the selected application for the user based on verification that the request for access complies with the organization policy. For example, authorization management module 256 may perform an API call associated with a role of the application to provision user access to the application. The role of the application may include writing reports, creating spreadsheets, manipulating images, keeping records, developing websites and calculating expenses, or the like.

In some implementations, application access platform 220 may provide access to the selected application for the user based on provisioning access to the selected application for the user. In contrast, application access platform 220 may deny access to the selected application based on the application access platform 220 verifying that the request for access does not comply with the organization policy.

In some implementations, application access platform 220 may provide information to the user associated with a denial of access to the application. For example, application access platform 220 may provide a reason for denying access (e.g., access would violate a security policy, access is not allowed for the user's job position, etc.) to the user via user interface on client device 210. Further details regarding block 440 are provided below with respect to FIG. 5.

In this way, application access platform 220 may selectively provide access to the selected target system.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
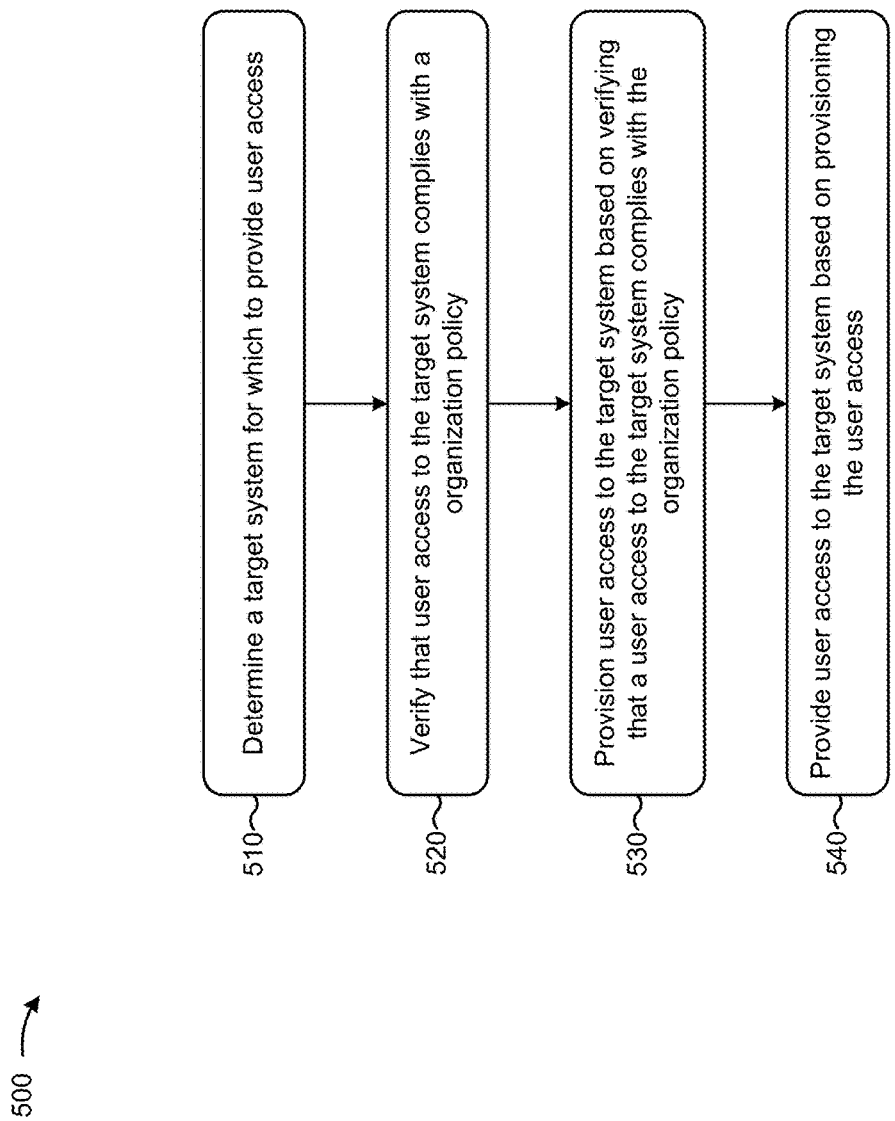
FIG. 5 is a flow chart of an example process for selectively providing access to a target system in an organization's software environment.

FIG. 5 is a flow chart of an example process 500 for selectively providing access to a target system in an organization's software environment. In some implementations, one or more process blocks of FIG. 5 may be performed by application access platform 220. In some implementations, one or more process blocks of FIG. 5 may be performed by another device or a group of devices separate from or including application access platform 220, such as client device 210.

As shown in FIG. 5, process 500 may include determining a target system for which to provide user access (block 510). For example, application access platform 220 may receive a selection of an application, associated with a target system, for which to provide access, as described herein. In some implementations, application access platform 220 may automatically select the application for which to provide access, as described herein. For example, application access platform 220 may recommend an application for a user based on user identification information, and may automatically select the application based on the recommendation.

In this way, application access platform 220 may determine a target system for which to provide user access.

As further shown in FIG. 5, process 500 may include verifying that user access to the target system complies with an organization policy (block 520). For example, application access platform 220 may verify that user access, to the application associated with the target system, complies with one or more organization policies. In some implementations, an organization policy may be associated with a governance, risk, and compliance (GRC) policy. A GRC policy may include information relating to processes established and executed by directors or a board of directors of an organization with regard to the organization's structure, management, and goal achievement. In some implementations, the organization policy may relate to a rule or regulation, a company guideline, bylaw, or policy, a security clearance policy, a separation of duties policy, or the like. In some implementations, an organization policy may include a rule set. For example, the rule set may establish criteria, the satisfaction of which grants a request for access.

In some implementations, application access platform 220 may determine that a request for access by a user complies with criteria for the organization policy, such as criteria based on information regarding an organization policy and user identification information (e.g., user identification information as described above with regard to FIG. 4). For example, application access platform 220 may compare job position information for the user seeking access to the application with details regarding the organization policy obtained from compliance module 258.

In some implementations, application access platform 220 may determine that the request for access complies with the criteria based on information provided by the user during the login process. For example, application access platform 220 may determine whether the user identification information, provided as part of the login request, matches the criteria for the organization policy. Application access platform 220 may determine that the user is associated with a correct role, experience level, security clearance, or the like, for the application based on information identifying the user's job position and the criteria for the organization policy, each of which may be obtained from, for example, a data structure. In some implementations, if application access platform 220 determines that the request for access complies with the criteria for the organization policy, then the user may be granted access to the application.

In some implementations, application access platform 220 may request that the user provide the same or additional information as that provided during the login process. For example, application access platform 220 may determine that the user identification information, provided as part of the login request, is not sufficient to determine if the criteria for the organization policy are met. In this case, application access platform 220 may provide a prompt to the user via the UI on client device 210 to provide additional information, associated with the user and/or the application, to permit application access platform 220 to determine whether the criteria for the organization policy are met.

In some implementations, application access platform 220 may obtain information regarding the organization policy. For example, application access platform 220 may obtain the information regarding the organization policy from compliance module 258. In some implementations, application access platform 220 may obtain the information regarding the organization policy from an external source. In some implementations, application access platform 220 may obtain all details regarding the organization policy. In some implementations, application access platform 220 may obtain a portion of the details regarding the organization policy. For example, application access platform 220 may obtain the portion of the details based on a request for access to an application, user identification information, a user's job position, or the like. By obtaining the portion of details regarding the organization policy, application access platform 220 may conserve computing resources compared to obtaining all of the details regarding the organization policy.

In some implementations, application access platform 220 may provide the information regarding the organization policy to the user. For example, application access platform 220 may provide a list of organization policies associated with a group of applications and may provide the list to the user via the UI on client device 210. In some implementations, application access platform 220 may provide the information regarding the organization policy based on the request for access. For example, application access platform 220 may provide information regarding the organization policy that would prevent the request for access from being granted. This may include the organization policy itself and/or the details of the organization policy that would prevent the request for access from being granted.

By providing the user with information regarding the organization policy, application access platform 220 may reduce network traffic, computing resource utilization, delay, cost, etc. associated with the user seeking to access an inappropriate application and provide a more efficient way for the user to determine that the request for access to the application is appropriate.

In some implementations, application access platform 220 may determine that the organization policy applies to a single application or that the organization policy applies to a plurality of applications. Alternatively, application access platform 220 may determine that a plurality of organization policies may apply to a single application. In some implementations, application access platform 220 may prompt the user for information each time application access platform 220 verifies a request for access using an organization policy of a plurality of organization policies. For example, application access platform 220 may prompt the user to provide different user identification information for each organization policy that is used to determine whether to grant access to an application.

In some implementations, application access platform 220 may deny the request for access to the application. For example, application access platform 220 may determine that the request for access to the application does not comply with the criteria for the organization policy. In some implementations, application access platform 220 may determine information regarding a reason for denying the request for access. For example, application access platform 220 may determine that the user's job position information did not meet the criteria for the organization policy. In some implementations, application access platform 220 may determine information regarding the reason for denying the request for access for each of a plurality of organization policies that are associated with the application.

In some implementations, application access platform 220 may provide the information regarding the reason for denying the request for access to the user. For example, application access platform 220 may provide a communication (e.g., an email, a text message, a voicemail, etc.) via the UI on client device 210, indicating that the request for access was denied because the user's job position did not meet the criteria for the organization policy.

By providing information regarding the reason for denying the request for access, application access platform 220 allows a user to efficiently and effectively understand why a request for access was denied. Furthermore, the user can verify that the denial was based on an appropriate reason, not an error with application access platform 220, thereby reducing utilization of computing resources to ensure that application access platform 220 is functioning correctly.

In some implementations, application access platform 220 may provide the information regarding the reason for denying the request for access to a second party (e.g., a supervisor, a human resources employee, a colleague, an Information Technology (IT) administrator, etc.). In some implementations, the second party may have the ability to grant access to the application. In some implementations, application access platform 220 provides the communication simultaneously to the user and to the second party.

By performing an initial screening for access to an application, application access platform 220 reduces network traffic, computing resource utilization, delay, cost, etc. relative to a second party (e.g., a supervisor) reviewing all requests for access to the application.

In some implementations, application access platform 220 may provide the user with the ability to escalate the request for access based on the denial of the request for access. For example, application access platform 220 may provide the user with a UI element on client device 210 that allows the user to escalate the request for access that was denied. In some implementations, application access platform 220 may provide the ability for the user to input information associated with escalating the request for access. For example, application access platform 220 may provide a UI field may allow the user to provide information related to a reason as to why the user submitted the request for access. In some implementations, application access platform 220 may receive follow up information from the user associated with the request for access (e.g., the reason for the request for access, information regarding user preferences, user identification information, a code for accessing the application, etc.).

In some implementations, application access platform 220 may determine an escalation score for the request for access. For example, the escalation score may be based on the follow up information provided by the user. Additionally or alternatively, the escalation score may be based on information associated with the user (e.g., information regarding user preferences, user identification information, job position information, the user's prior usage of an application and/or a combination of applications, office location, whether access to an application has been set up for the user or other users of the application, etc.) and/or the application (e.g., application usage, applications previously determined to be beneficial to a job, etc.). Additionally or alternatively, application access platform 220 may determine the escalation score based on information associated with other users (e.g., information associated with users with similar job positions as the user, all users having access to an application, etc.). In some implementations, application access platform 220 may apply different weights to the criteria that are used in determining the escalation score. In some implementations, application access platform 220 may generate the escalation score using computer-implemented techniques and/or big data analytics techniques discussed above.

In some implementations, application access platform 220 may escalate the request for access based on a user input. For example, application access platform 220 may escalate the request for access based on receiving a user input via the UI element on client device 210 to escalate the request for access. In some implementations, application access platform 220 may request that the user provide information (e.g., via a user interface of client device 210) regarding the request for access before escalating the request for access. For example, application access platform 220 may request that the user to provide a reason for the request for access after the user selected the UI element on client device 210 to escalate the request for access.

In some implementations, application access platform 220 may automatically escalate the request for access without receiving the user input. For example, application access platform 220 may automatically escalate the request for access if the request for access meets predetermined criteria. For example, application access platform 220 may automatically escalate the request for access if the request for access is associated with a particular application, a job position, whether the request for access was denied during a particular time period, if a match score for the application and/or an escalation score for the application satisfies a threshold, or the like.

In some implementations, application access platform 220 may provide a communication to one or more second parties associated with the user and/or the application (e.g., a first supervisor, a second supervisor, an IT administrator, an application manager, etc.) regarding the request for access. For example, application access platform 220 may provide a communication (e.g., a user interface, an email, a text message, a voicemail, etc.) to a supervisor of the user that includes an element (e.g., a link, a button, a checkbox, a drop down list, etc.) for a supervisor to grant or deny access to the application. In some implementations, application access platform 220 may provide information to the one or more second parties regarding the organization policy for which the request for access did not comply.

In some implementations, application access platform 220 may provide a recommendation indicating how the one or more second parties should act on the request for access. For example, application access platform 220 may provide the communication to the user's supervisor with a recommendation that the request for access should be granted. The recommendation may be based on information associated with the user and/or the application. Additionally or alternatively, application access platform 220 may determine the recommendation based on information associated with other users. In some implementations, the recommendation may be based on information provided by the user (e.g., a reason for the request for access, etc.) with regard to escalating the request for access. In some implementations, application access platform 220 may apply different weights to the criteria that are used in determining the recommendation. In some implementations, application access platform 220 may generate the recommendation using a technique (e.g., a computer-implemented technique, a big data analytics technique, etc.), such as one of the techniques discussed above.

In some implementations, application access platform 220 may receive information from a second party, of the one or more second parties, based on the communication. For example, application access platform 220 may receive an indication from a supervisor to grant the user access to the application. In some implementations, application access platform 220 may provide the information from the second party to the user. For example, application access platform 220 may receive a communication that includes a code for accessing the application from the supervisor and application access platform 220 may provide the code to the user. In some implementations, application access platform 220 may provide the communication with a reference to data (e.g., a link, a hyperlink, etc.) that allows the user to select the reference to gain access (e.g., immediate access) to the application. In some implementations, the reference to data may be a link to information associated with an organization policy. In some implementations, application access platform 220 may provide a prompt to the user to receive subsequent information from the user in response to providing the information from the second party to the user. For example, application access platform 220 may provide a UI element on client device 210 that allows the user to enter the code for accessing the application. In some implementations, application access platform 220 may process the subsequent information (e.g., based on NLP) provided by the user. Subsequent communications between the second party and user may occur as described above.

In some implementations, application access platform 220 may grant or deny access to the application based on escalating the request for access that was previously denied. For example, application access platform 220 may provide or forego providing access to the application based on a response from a user's supervisor regarding the denial of the request for access. In some implementations, application access platform 220 may also provide information regarding the denial of the request for access following the escalation. For example, application access platform 220 may provide a communication to the user via a UI on client device 210 indicating that the supervisor does not permit the user to access an application and that the request for access is denied.

In some implementations, application access platform 220 may receive information from the second party regarding criteria to determine whether to grant the request for access. For example, application access platform 220 may receive a supervisor's user identification information (e.g., job position information, password, etc.) and application access platform 220 may use the supervisor's user identification information to determine whether to grant the request for access following escalation of the request for access.

By providing a way for a user to request access to an application after a request for access is denied, application access platform 220 reduces network traffic, computing resource utilization, delay, cost, etc. relative to the user's continued unsuccessful attempts to access the application. Application access platform 220 may also reduce network traffic, computing resource utilization, delay, cost, etc. associated with preventing the user from involving a second party (e.g., a supervisor) that may have nothing to do with granting access to the application.

In some implementations, application access platform 220 may receive information indicating a change to an organization policy. For example, application access platform 220 may receive information from a user's supervisor indicating that an organization policy that was used to verify the request for access is old and the organization policy has been updated. In some implementations, application access platform 220 may receive information indicating the change based on the denial of the request for access. In some implementations, application access platform 220 may grant or deny the request for access based on the updated organization policy.

In this way, application access platform 220 may verify that user access to the target system complies with an organization policy.

As further shown in FIG. 5, process 500 may include provisioning user access to the target system based on verifying that a user access to the target system complies with the organization policy (block 530). For example, application access platform 220 may provision access to the application, associated with the target system, based on determining that a request for access complies with the organization policy. In some implementations, application access platform 220 may provision access by determining that information associated with a user profile for the application exists for that user.

In some implementations, application access platform 220 may create and/or modify the user profile for the user with regard to the application. For example, the user profile may not have requested a phone number during an initial setup, but the organization policy may need a phone number for the user to have access to the application. Application access platform 220 may request and receive the phone number from the user. Application access platform 220 may provide the phone number to identity management module 260 to update the user profile. In some implementations, application access platform 220 may determine that the user profile exists and/or that the user profile is complete for access to the application by communicating with identity management module 260. In some implementations, application access platform 220 may provide the user profile to authorization management module 256 to complete a process for provisioning access to the application.

In some implementations, application access platform 220 may automatically update information associated with the user profile for the application. For example, application access platform 220 may automatically synchronize the information associated with the user profile for the application via identity management module 260. In some implementations, application access platform 220 may perform the automatic synchronization periodically, at random times, according to a schedule, or like. In some implementations, application access platform 220 may perform the automatic synchronization of the application based on information associated with the user, based on inputs received from the user, based on inputs received from a second party, or the like.

In some implementations, application access platform 220 may obtain information (e.g., user identification information, address, phone number, social security number, personal photograph, fingerprint, job position information, password, etc.) for the user profile. For example, application access platform 220 may obtain information from the user via client device 210, from a data structure (e.g., NLP of social media account, etc.), from a second party by transmitting a request to a client device 210 used by the second party, or the like.

In this way, application access platform 220 may provision user access to the target system based on verifying that a user access to the target system complies with the organization policy.

As shown in FIG. 5, process 500 may include providing user access to the target system based on provisioning the user access (block 540). For example, application access platform 220 may provide access to the application, associated with the target system, for the user via client device 210. In some implementations, application access platform 220 may provide information indicating that the request for access is granted. For example, application access platform 220 may provide push notifications, pop-up notifications, email notifications, tab flashing notifications, a link to the application, or the like.

In some implementations, application access platform 220 may cause the application to be provided via a web browser, via the UI on client device 210, or the like. In some implementations, application access platform 220 may provide information associated with access to the application via a network device. For example, application access platform 220 may provide information via a firewall associated with application access platform 220, via a network device associated with an organization intranet in which client device 210 is operating, via a network device associated with a private network with which client device 210 is associated, or the like.

In this way, application access platform 220 may provide user access to the target system based on provisioning the user access.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

By automatically providing recommendations with regard to applications associated with target systems that may be of interest to a user, application access platform 220 may reduce network traffic as the user does not need to manually search through multiple lists of applications to identify a relevant application. Further, by automatically approving and provisioning access to the application for the user, application access platform 220 may help to ensure compliance with security and other organization policies while also reducing network traffic relevant to escalating a request for access to a party that governs access (e.g., a supervisor). Additionally, by providing relevant information to the user and/or parties involved with approving and provisioning access to the application, application access platform 220 may reduce network traffic relevant to determining whether an escalated request for access to the application is appropriate.

Moreover, by automatically approving access, application access platform 220 reduces a likelihood of incorrectly approving access to applications, thus reducing computing resource utilization relative to users being required to audit and potentially revise information associated with applications.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
 authenticate a user for access to a plurality of target systems;
 generate relevance scores for the plurality of target systems, each relevance score indicating relevance of a respective target system to the user,
  each relevance score being generated by processing, using a first machine learning technique, information associated with the user and at least one of:
  information associated with the plurality of target systems, or
  information associated with a plurality of other users;
 generate, based on the relevance scores, a first recommendation specifying one or more recommended target systems of the plurality of target systems;
 provide, based on the first recommendation, information identifying the one or more recommended target systems of the plurality of target systems,
  the information identifying the one or more recommended target systems including information that causes presentation of data representing the one or more recommended target systems based on one or more corresponding relevance scores of the relevance scores;
 receive information associated with a request for access to a particular target system of the one or more recommended target systems;
 determine whether the request for access complies with one or more policies associated with the particular target system;
 deny the request for access,
  where denying the request for access includes foregoing providing access to the particular target system based on determining that the request for access does not comply with the one or more policies;
 receive information associated with an escalation of the request for access based on denying the request for access;
 generate, using a second machine learning technique and based on the information associated with the escalation of the request for access, an escalation score for the escalation of the request for access; and
 provide access to the particular target system based on the escalation score for the escalation of the request for access.

2. The device of claim 1, where the one or more processors, when receiving information associated with the escalation, are to:
 receive information regarding a reason to grant the request for access; and
 where the one or more processors, when generating the escalation score for the escalation of the request for access, are to:
  generate the escalation score for the escalation of the request for access based on the reason to grant the request for access.

3. The device of claim 1, where the one or more processors are further to:
 generate a recommendation to grant the request for access or to deny the request for access based on the escalation score for the escalation of the request for access; and
 provide information regarding the recommendation to grant the request for access or to deny the request for access.

4. The device of claim 1, where the one or more processors are further to:
 escalate the request for access based on denying the request for access.

5. The device of claim 1, where the one or more processors are further to:
 automatically escalate the request for access based on information associated with at least one of:
 the user,
 the one or more target systems, or
 a plurality of users.

6. The device of claim 1, where the one or more processors are further to:
 create or modify a user profile that is associated with the particular target system and to provision access to the particular target system based on the user profile; and
 where the one or more processors, when providing the access, are to:
  provide the access based on provisioning the access.

7. The device of claim 1, where the one or more processors are further to:
 receive information associated with the plurality of target systems;
 perform indexing to index the plurality of target systems based on the information associated with the plurality of target systems; and
 where the one or more processors, when providing information identifying the one or more recommended target systems, are to:
  provide information identifying the one or more recommended target systems based on indexing the plurality of target systems.

8. A method, comprising:
 authenticating, by a device, a user for access to a plurality of web applications;
 generating, by the device, relevance scores for the plurality of web applications, each relevance score indicating relevance of a respective web application to the user,
  each relevance score being generated by processing, using a first machine learning technique, information associated with the user and at least one of:
  information associated with the plurality of web applications, or information associated with a plurality of other users;
generating, by the device and based on the relevance scores, a first recommendation specifying one or more recommended web applications of the plurality of web applications;
providing, by the device and based on the first recommendation, information identifying the one or more recommended web applications of the plurality of web applications,
the information identifying the one or more recommended web applications including information that causes presentation of data representing the one or more recommended web applications based on one or more corresponding relevance scores, of the relevance scores;
receiving, by the device, information associated with a request for access to a particular web application of the one or more recommended web applications;
determining, by the device, whether the request for access complies with one or more policies associated with the particular web application;
denying, by the device, the request for access based on determining that the request for access does not comply with the one or more policies;
receiving, by the device, escalation information associated with escalating the request for access based on denying the request for access;
generating, by the device and using a second machine learning technique and based on the escalation information, an escalation score for the escalation information; and
selectively providing, by the device, access to the particular web application based on the escalation score.

9. The method of claim 8, where selectively providing access to the particular web application comprises:
providing a link to the particular web application, the link providing access the particular web application.

10. The method of claim 8, further comprising:
escalating the request for access based on denying the request for access; and
where receiving escalation information comprises:
receiving a reference to data associated with the particular web application or the one or more policies.

11. The method of claim 8,
where providing the information identifying the one or more recommended web applications comprises:
providing information identifying a particular recommendation for the particular web application.

12. The method of claim 8, further comprising:
receiving information associated with authenticating the user for access to the plurality of web applications; and
where generating the first recommendation comprises:
generating the first recommendation based on the information associated with authenticating the user for access to the plurality of web applications.

13. The method of claim 8, further comprising:
performing natural language processing on the escalation information; and
where generating the escalation score further comprises:
generating the escalation score based on a result of performing the natural language processing.

14. A non-transitory computer-readable medium storing instructions, the instructions comprising:
one or more instructions that, when executed by one or more processors, cause the one or more processors to:
authenticate a user for access to a plurality of applications;
generate, for a user, relevance scores for a plurality of applications, each relevance score indicating relevance of a respective application to the user,
each relevance score being generated by processing, using a first machine learning technique, information associated with the user and at least one of:
information associated with the plurality of applications, or
information associated with a plurality of other users;
generate, based on the relevance scores, a first recommendation specifying one or more recommended applications of the plurality of applications;
provide, to the user and based on the first recommendation, information identifying the one or more recommended applications of the plurality of applications;
receive a request for access to a particular application of the one or more recommended applications;
generate, using a second machine learning technique and based on information associated with the request for access and based on information associated with the user, an escalation score;
determine, based on the escalation score and one or more policies associated with the particular application, to escalate the request for access;
receive escalation information associated with the request for access;
provision access to the particular application based on the escalation information; and
provide access to the particular application based on provisioning access.

15. The non-transitory computer-readable medium of claim 14, where the one or more instructions, that cause the one or more processors to provision access to the particular application based on the escalation information, cause the one or more processors to:
provision access to the particular application based on performing an application programming interface (API) call associated with a function of the particular application.

16. The non-transitory computer-readable medium of claim 14, where the one or more instructions, that cause the one or more processors to provision access to the particular application based on the escalation information, cause the one or more processors to:
provision access to the particular application using information associated with a user profile.

17. The non-transitory computer-readable medium of claim 14, where the request for access is a first request for access, the particular application is a first application, and the one or more policies are a first policy, and
where the one or more instructions, when executed by the one or more processors, further cause the one or more processors to:
receive a second request for access to a second application of the one or more recommended applications;
generate, using the second machine learning technique and based on second escalation information associated with the second request for access and based on the information associated with the user, a second escalation score; and
deny the second request for access based on the second escalation score and one or more second policies associated with the second application.

18. The non-transitory computer-readable medium of claim 17, where the one or more instructions, when executed by the one or more processors, further cause the one or more processors to:
provide information associated with denying the second request for access to a party associated with an ability to grant access to the second application.

19. The non-transitory computer-readable medium of claim 17, where the escalation information is received from a first client device, and the second escalation information is received from a second client device,
the second client device being different from the first client device.

20. The device of claim 1, wherein the one or more processors are further to:
identify a reason for the request for access by performing a natural language processing technique on the escalation information; and
wherein the one or more processors, when generating the escalation score, are further to:
generating the escalation score based on the reason.

\* \* \* \* \*